United States Patent [19]
Fan

[11] Patent Number: 5,906,655
[45] Date of Patent: May 25, 1999

[54] METHOD FOR MONITORING INTEGRITY OF AN INTEGRATED GPS AND INU SYSTEM

[75] Inventor: Zhejun Fan, Dunlap, Ill.

[73] Assignee: Caterpillar Inc., Peoria, Ill.

[21] Appl. No.: 08/832,592

[22] Filed: Apr. 2, 1997

[51] Int. Cl.$^6$ ................................. G01S 5/14; G05D 1/02
[52] U.S. Cl. .......................... 701/216; 342/457; 701/220
[58] Field of Search .................................... 701/213, 214, 701/216, 220, 117, 2, 24; 342/357, 457

[56] References Cited

U.S. PATENT DOCUMENTS

| | | | |
|---|---|---|---|
| 5,617,317 | 4/1997 | Ignagni | 364/449.9 |
| 5,646,845 | 7/1997 | Gudat et al. | 364/424.051 |
| 5,657,025 | 8/1997 | Ebner et al. | 342/357 |
| 5,787,384 | 7/1998 | Johnson | 701/216 |

FOREIGN PATENT DOCUMENTS

| | | |
|---|---|---|
| 0498655A2 | 2/1992 | European Pat. Off. . |
| 96/12973 | 5/1996 | WIPO . |

Primary Examiner—Michael Zanelli
Attorney, Agent, or Firm—David M. Masterson

[57] ABSTRACT

A method for monitoring the integrity of an integrated positioning system located on a mobile machine is provided. The integrated positioning system includes a GPS receiver and an inertial navigation unit (INU). The INU includes an odometer, a Doppler radar, a gyroscope, and a sensor for measuring the steering angle of the mobile machine. The method includes the steps of receiving a GPS position estimate from a GPS receiver, receiving an INU position estimate from an inertial navigation unit, and comparing the GPS position estimate and the INU position estimate. If the two position estimates are the same, then the system is VALID. Otherwise, the velocity of the mobile machine as determined by the odometer and velocity as determined by the Doppler radar are compared. If the difference is greater than a first predetermined threshold, then the INU is determined to be INVALID. Otherwise a heading rate from gyroscope is compared with a calculated heading rate based on measured steering angle and velocity. If the difference is greater than a second predetermined threshold, then the INU is INVALID, otherwise the GPS is INVALID.

10 Claims, 5 Drawing Sheets

METHOD FOR MONITORING INTEGRITY OF AN INTEGRATED GPS AND INU SYSTEM

TECHNICAL FIELD

The present invention relates generally to the control of autonomous machines and, more particularly, to a method for monitoring the integrity of an integrated GPS and INU system.

BACKGROUND ART

Improvements in positioning systems are making autonomous machines, such as autonomous earthmoving machines, a reality.

In order to achieve autonomy, a machine must at all times be able to determine its position relative to its environment. One system commonly used to achieve this goal is the Global Positioning System or GPS. The GPS consists of a plurality of satellites which transmit electromagnetic signals. A GPS receiver located within the range of the satellites receives signals from the satellites and determines the position of the receiver using triangulation methods.

It is possible to use a GPS receiver alone for positioning. However, when high accuracy is required, integrated positioning systems are preferred. An integrated positioning system uses measurements from several different types of sensors to achieve highly accurate positioning information.

Many examples of integrated positioning systems are known. Such integrated systems use GPS navigation signals as well as measurements from inertial and other machine motion type sensors to produce more accurate position estimates. However, these systems are generally of custom design and are therefore expensive and burdensome to implement.

Integrated systems are limited by reliance on the machine motion type sensors. Their accuracy is limited, thus, they are typically used only for short distances.

Typically, in most integrated systems it is assumed that a position estimate from a GPS receiver is accurate. However, experience has shown that GPS position estimates also tend to drift. Over-reliance on GPS position estimates decreases the usability of the overall autonomous system.

The present invention is directed at one or more of the problems as set forth above.

DISCLOSURE OF THE INVENTION

In one aspect of the present invention, a method for monitoring the integrity of an integrated positioning system located on a mobile machine is provided. The integrated positioning system includes a GPS receiver and an inertial navigation unit (INU). The INU includes an odometer, a Doppler radar, a gyroscope, and a sensor for measuring the steering angle of the mobile machine. The method includes the steps of receiving a GPS position estimate from a GPS receiver, receiving an INU position estimate from an inertial navigation unit, and comparing the GPS position estimate and the INU position estimate. If the two position estimates are the same, then the system is VALID. Otherwise, the velocity of the mobile machine as determined by the odometer and velocity as determined by the Doppler radar are compared. If the difference is greater than a first Predetermined threshold, then the INU is determined to be INVALID. Otherwise, a heading rate from the gyroscope is compared with a calculated heading rate based on measured steering angle and velocity. If the difference is greater than a second predetermined threshold, then the INU is determined to be INVALID. Otherwise, the GPS is determined to be INVALID.

BEST MODE FOR CARRYING OUT THE INVENTION

With reference to the drawings, the present invention provides a method for monitoring integrity of an integrated GPS and INU system.

The integrated system is used to determine the operating point of a mobile machine. The operating point is some predetermined fixed point located somewhere on the machine. The term "operating point" refers to a dynamic machine position and attitude. The dynamic parameters describing a machine's dynamic position and attitude may include, for example, position, velocity, acceleration, heading, pitch, roll, speed, heading rate, pitch rate, and roll rate.

Figure 1:
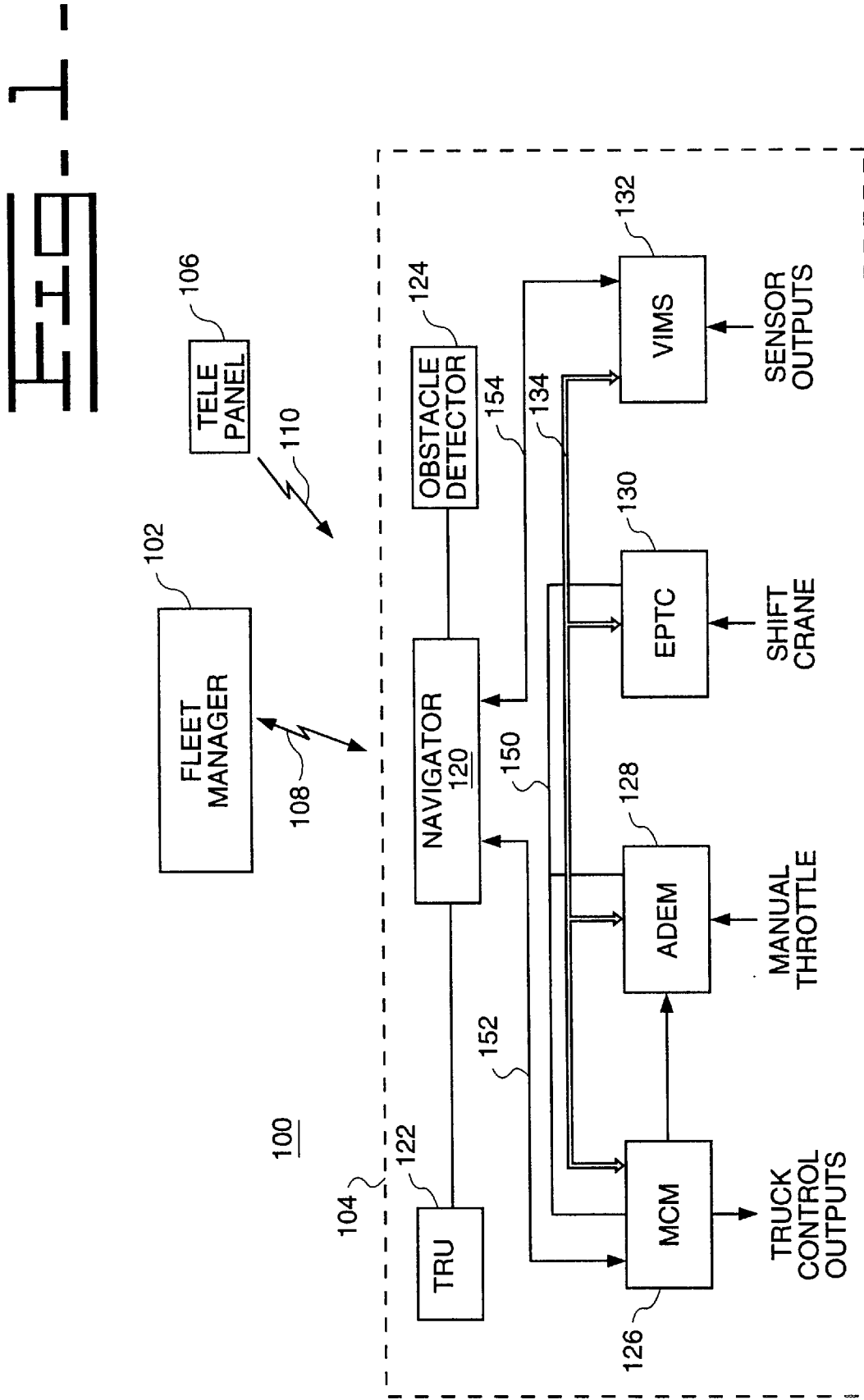
FIG. 1 is a high level block diagram showing the autonomous machine system of the invention.

In the preferred embodiment, the operating point includes north position, east position, speed, heading, and heading rate. With reference to FIG. 1 for purposes of illustration, the invention is described in the environment of an autonomous machine system 100. This is done for purposes of illustration only. A person skilled in the art will recognize that the invention may be used in other applications.

FIG. 1 is a high level block diagram showing an autonomous machine system 100. The autonomous machine system 100 includes a fleet manager 102, a machine control system 104, and a tele-operation panel 106. The fleet manager 102 is configured to manage a fleet of autonomous mobile machines such as dump trucks. The fleet manager 102 acts like a foreman, assigning tasks to the mobile machines and tracking their progress as they perform these tasks. The fleet manager 102 communicates with each machine via a radio link 108. Each machine includes an on-board machine control system 104. The machine control system 104 permits autonomous operation of the mobile machine under the control of fleet manager 102. The machine control system 104 includes a navigator 120, a truck reference unit (TRU) 122, an obstacle detector 124, a machine control module (MCM) 126, an advanced diesel engine manager (ADEM) 128, an electronic programmable transmission control (EPTC) 130, and a vital information management system (VIMS) 132.

The navigator 120 receives instructions from the fleet manager 102 via radio link 108. The instructions include, for example, a work assignment or task. From the task, navigator 120 determines a route to be followed. The route may be, for example, a haul segment between an excavation site and a crusher site in an open pit mining operation.

The TRU 122 determines the operating point of the machine based on measurements determined from a satellite based positioning system and onboard sensors. Based on the machine's operating point and the desired route, the navigator 120 generates a desired steering angle and a desired speed for the machine. The obstacle detector 124 is a radar unit which scans the area in front of the machine for obstacles. When obstacle detector 124 detects an obstacle, it provides an indication that an obstacle is detected and/or the location of the obstacle to navigator 120. The navigator 120 may then stop the machine or navigate around the obstacle.

The tele-operation panel 106 may be used to communicate, via radio signals as indicated at 110, steer angle, speed and other commands directly to the navigator 120 to allow remote control operation of the machine.

The navigator 120, TRU 122, and obstacle detector 124 represent onboard intelligence for the machine which allows autonomous control commands to be generated in the form of the speed and steering angle commands. The navigator 120 produces speed and steering angle commands based on a desired route of travel and the machine's operating point. The navigator 120 computes the adjustments of the present steering angle and speed based on the current operating point to move the machine along the desired route. The fleet manager 102 provides the navigator 120 with the desired route. The TRU 122 provides the navigator 120 with the operating point of the autonomous machine.

Figure 2:
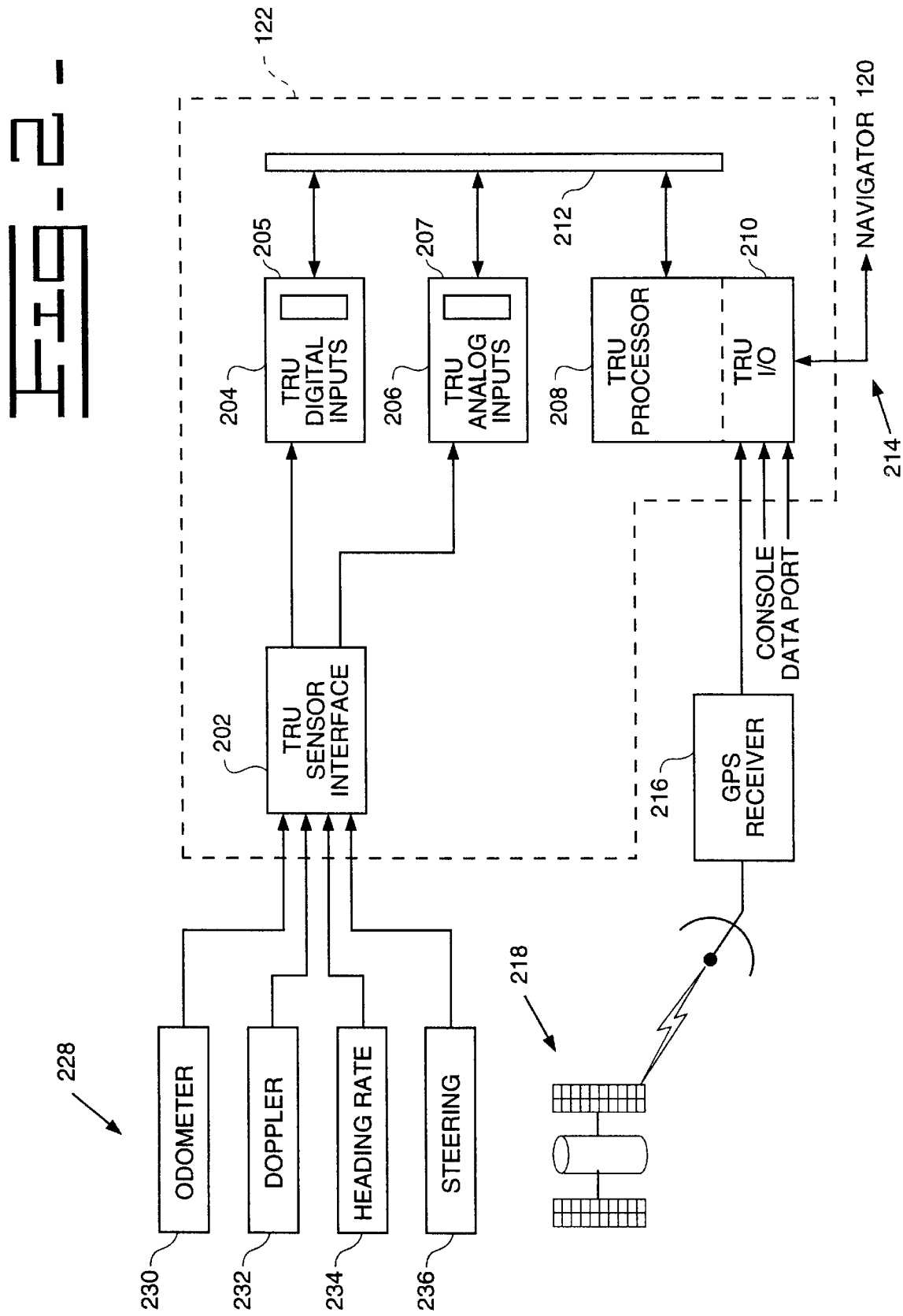
FIG. 2 is a block diagram illustrating the structure of the truck reference unit of the invention.

A block diagram illustrating the structure of TRU 122 is shown in FIG. 2. In the preferred embodiment, the TRU 122 includes a TRU sensor interface 202, a TRU digital input card 204, a TRU analog input card 206, a TRU processor 208, a TRU serial interface 210, and a TRU databus 212.

Sensor interface 202 receives signals from the inertial navigation unit (INU) 228. The INU 228 includes a bidirectional odometer 230, a Doppler ground speed indicator 232, a solid-state heading rate sensor 234, and a steering resolver 236. The bi-directional odometer 230 measures the distance the machine travels and the direction, i.e. forward or reverse. The Doppler ground speed indicator 232 measures the speed the machine is traveling. The solid-state heading rate sensor 234 measures the rate at which the machine is changing heading or turning. The steering resolver 236 measures the steering angle of the machine.

One skilled in the art would recognize that various other sensors could be used to measure the same parameters. For example, a tachometer could be used to measure speed, or a gyroscope could be used to measure heading rate.

Furthermore, measurements could be taken from additional or different sensors and incorporated into the invention in an attempt to gain additional accuracy. For example, an inclinometer could be used to measure angle of ascent, a pitch rate sensor could be used to measure the rate of change of ascent, or a compass could be used to measure heading. On the other hand, some sensors could be eliminated in an effort to save costs at the expense of some loss in accuracy.

The sensor measurements are collected by sensor interface 202. The sensor interface 202 passes digital signals, i.e. timing strobes, pulse-width modulated signals, etc., to digital input card 204, and analog signals, i.e. voltages, currents, etc., to analog input card 206. The digital input card 204 converts the digital timing and pulse signals to digital values and stores them in a digital register 205. The analog input card 206 scales and converts the analog signals to digital values and stores them in an analog register 207. The TRU processor 208, a general purpose microprocessor, accesses the digital register 205 or analog register 207 via the databus 212 to obtain the sensor measurements.

The TRU 122 receives position data from a satellite-based positioning system 218. In the preferred embodiment, the satellite-based positioning system 218 is the Global Positioning System (GPS). A GPS receiver 216 receives satellite signals from satellite-based positioning system 218 and determines its own position based on these signals. In the preferred embodiment, the GPS receiver 216 is a differential GPS receiver. The GPS receiver 216 provides TRU 122 with receiver determined measurements including north position, east position, north velocity, and east velocity as well as timing information. TRU 122 receives the measurements from GPS receiver 216 via serial interface 210. The TRU processor 208 receives the GPS receiver measurements from serial interface 210. With the GPS receiver determined measurements and the sensor measurements obtained above, the TRU processor 208 computes an estimate of the operating point of the autonomous machine using a Kalman filter. The TRU processor 208 passes the operating point to the serial interface 210 which in turn sends the operating point to the navigator 120 over serial data line 214.

In general, a Kalman filter is an optimal linear least-means-squared estimator. In the preferred embodiment, an extended Kalman filter is used. An extended Kalman filter uses a linearized model based on the current state of a non-linear system to compute least-means-squared estimates. While the discussion uses "Kalman filter" and "Kalman filtering", it applies equally well to "extended Kalman filter" and "extended Kalman filtering". Kalman filtering is well known in the art and is therefore not further discussed.

Figure 3:
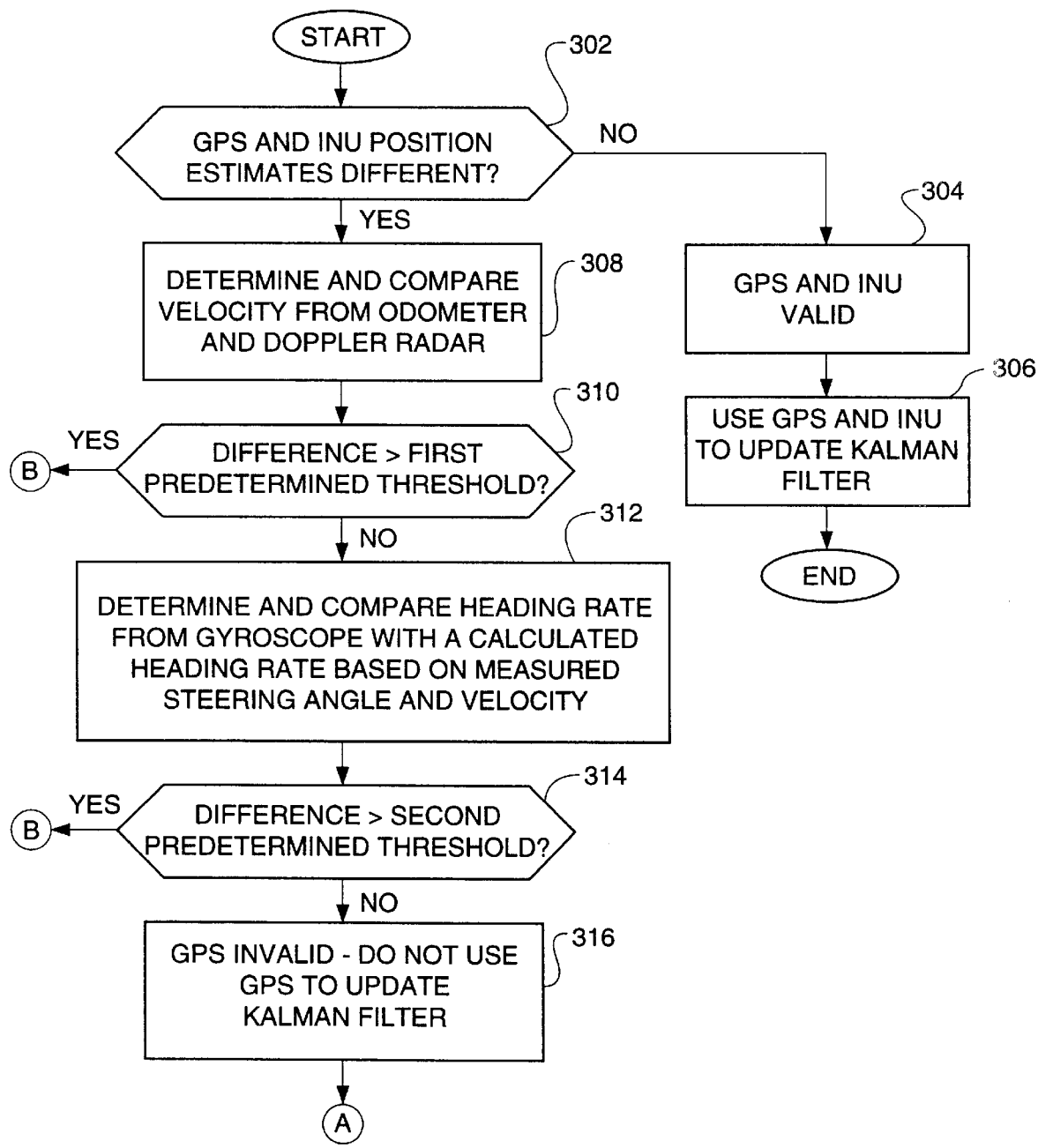
FIG. 3 is a flow chart illustrating the operation of the present invention.
Figure 4:
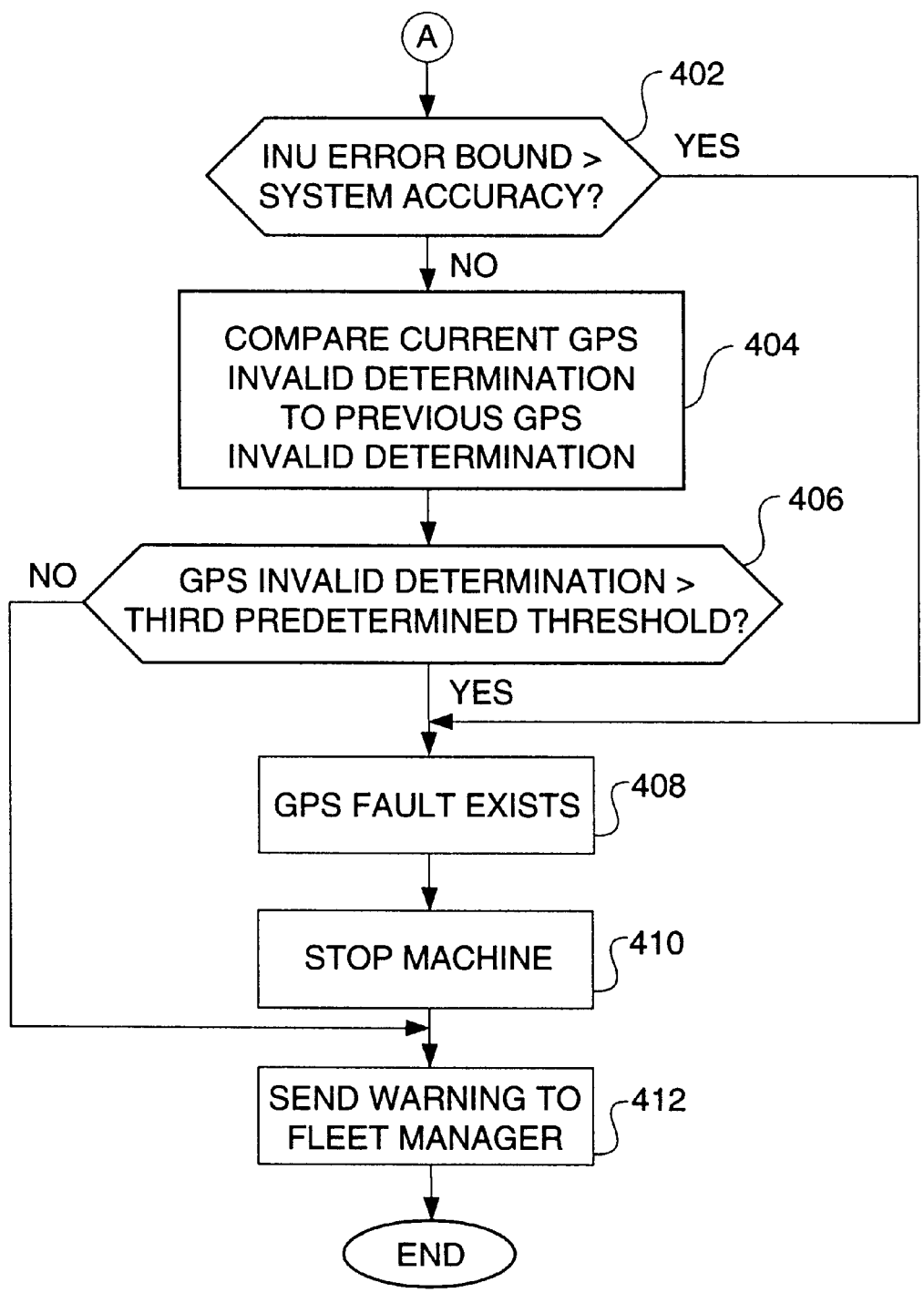
FIG. 4 is a flow chart illustrating one aspect of the present invention.
Figure 5:
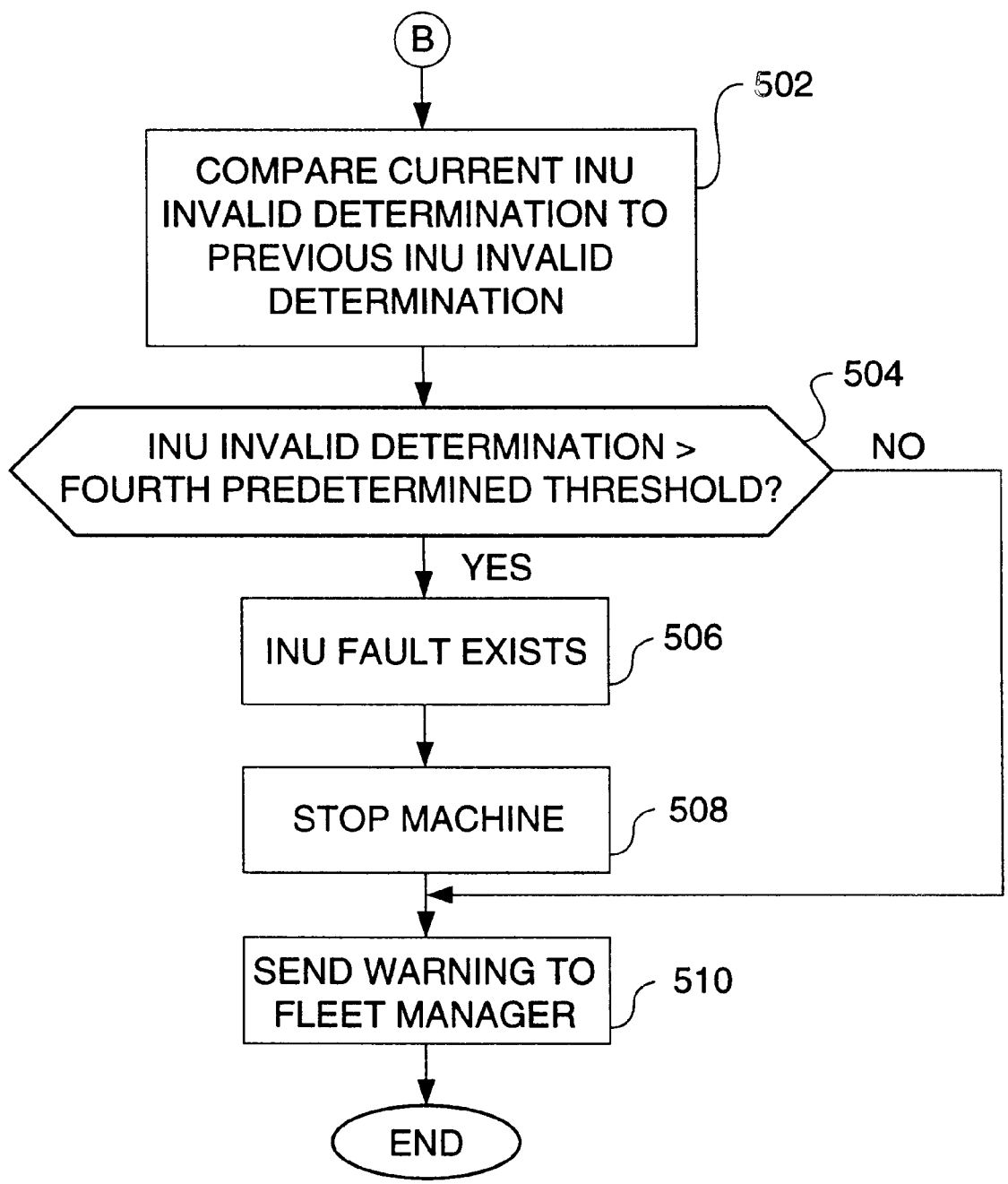
FIG. 5 is a flow chart illustrating another aspect of the present invention.

With reference to FIGS. 3–5, a method for monitoring integrity of an integrated GPS and INU system, according to an embodiment of the present invention, will now be discussed. In the preferred embodiment, the present invention is embodied in software which is run on the TRU processor 208.

Referring to FIG. 3, in a first decision block 302, GPS and INU position estimates are compared. If they are equal (within a predetermined threshold), then the method proceeds to a first control block 304.

In the first control block 304, both the GPS and INU are determined to be VALID. Program control then proceeds to a second control block 306. In the second control block 306, both the GPS and INU are used to update the Kalman filter, i.e., to compute a new estimate of the operating point of the machine.

If, in the first decision block 302, the GPS and INU position estimates are different, then the method proceeds to a third control block 308.

In the third control block 308, first and second velocity estimates are determined from INU data and compared. In the preferred embodiment, the first estimate is calculated from odometer data and the second estimate is calculated from data from the Doppler radar.

In a second decision block 310, if the first and second velocity estimates are equal (within a first predetermined threshold) then control proceeds to a control block 502 in FIG. 5, which is discussed below. Otherwise control proceeds to a fourth control block 312.

In the fourth control block 312, first and second heading rate estimates are determined from INU data and compared. In the preferred embodiment, the first estimate is from a gyroscope and the second estimate is calculated based on steering angle and velocity.

In a third decision block 314, if the first and second heading rate estimates differ by more than a second predetermined threshold, then control proceeds to a control block 502 in FIG. 5, which is discussed below. Otherwise, control proceeds to a fifth control block 316.

In the fifth control block 316, the GPS is declared INVALID. If the GPS is determined to be INVALID, it will not be used to update the Kalman filter. Control then proceeds to a fourth decision block 402 in FIG. 4.

Referring now to FIG. 4, in the fourth decision block 402, an INU error bound is compared to a system accuracy. The system accuracy is the maximum allowable deviation from the true position of the machine. For example, if the system accuracy is determined to be 1 meter, then the position of the machine should not deviate more than 1 meter from the true position of the machine.

The INU error bound is the amount of deviation determined to be introduced by errors in the INU system as the machine travels. For example, if the INU error bound is determined to be 2% times the distance traveled, then the INU will introduce 2 meters of error for every 100 meters the machine travels.

Using the same example of a 2% INU error bound, if the machine travels 10 meters, the INU error would be 0.2 meter. Assuming a typical GPS accuracy of 1 meter, the INU is more accurate over short distances.

Referring back to the fourth decision block 402, if the INU error bound is not greater than the system accuracy, then control proceeds to a sixth control block 404. Otherwise, control proceeds to a seventh control block 408.

In the sixth control block 404, the current GPS INVALID determination is compared to any previous GPS INVALID determinations.

In a fifth decision block 406, the GPS INVALID determination is compared to a third predetermined threshold. In one embodiment, the third predetermined threshold is a count of GPS INVALID determinations. In another embodiment, the third predetermined threshold is a limit to the value of the GPS INVALID determination.

If the GPS INVALID determination exceeds the third predetermined threshold, then control proceeds to the seventh control block 408, where it is determined that a GPS fault exists. Otherwise, control proceeds to a ninth control block 412.

From the seventh control block 408, control proceeds to an eighth control block 410. In the eighth control block 410, the machine is stopped. Then, in the ninth control block 412, a warning is sent to the fleet manager 102. The warning allows site personnel to take whatever actions are appropriate for the particular situation. For example, the mobile machine may be scheduled for service.

Referring back to FIG. 3, if the difference in INU velocity from an odometer and doppler radar is determined to be greater than a first predetermined threshold in the second decision block 310, or the difference in INU heading rate from a gyroscope and from steering angle and velocity calculations is determined to be greater than a second predetermined threshold in the third decision block 314, then control proceeds to a tenth control block 502 in FIG. 5.

Referring now to FIG. 5, in the tenth control block 502, the current INU INVALID determination is compared to any previous INU INVALID determinations.

In a sixth decision block 504, the INU INVALID determination is compared to a fourth predetermined threshold. In one embodiment, the fourth predetermined threshold is a count of INU INVALID determinations. In another embodiment, the fourth predetermined threshold is a limit to the value of the INU INVALID determination.

If the INU INVALID determination exceeds the fourth predetermined threshold, then control proceeds to an eleventh control block 506, where it is determined that an INU fault exists. Otherwise, control proceeds to a thirteenth control block 510.

From the eleventh control block 506, control proceeds to a twelfth control block 508. In the twelfth control block 508, the machine is stopped. Then, in the thirteenth control block 510, a warning is sent to the fleet manager 102. The warning allows site personnel to take whatever actions are appropriate for the particular situation. For example, the mobile machine may be scheduled for service.

Industrial Applicability

With reference to the drawings and in operation, the present invention provides a method for monitoring the integrity of an integrated GPS/INU system. The integrated system is preferably adapted to determine an operating point of a mobile machine. Operating point is defined as a dynamic machine position and attitude. The dynamic parameters describing a machine's dynamic position may include, for example, position, velocity, acceleration, heading, pitch, roll, speed, heading rate, pitch rate, and roll rate.

The present invention utilizes the Global Positioning System or GPS. A GPS receiver receives signals from the GPS satellites. An inertial navigation unit (INU) is also used to provide sensed information. GPS receiver provided information and INU provided information are combined using a Kalman filter to provide the operating point.

The present invention provides a method whereby several estimates of given parameters based on sensed data are compared internally to determine if the system is functionally proper (system is VALID) or, if not, whether the GPS or INU is functionally improper.

Other aspects, objects, and features of the present invention can be obtained from a study of the drawings, the disclosure, and the appended claims.

I claim:

1. A method for monitoring the integrity of an integrated positioning system located on a mobile machine, the integrated positioning system including a GPS receiver and an inertial navigation unit (INU), the INU including an odometer, a Doppler radar, a gyroscope, and a sensor for measuring the steering angle of the mobile machine, including the steps of:

a) receiving a GPS position estimate from a GPS receiver;
   b) receiving an INU position estimate from an inertial navigation unit;
   c) comparing the GPS position estimate and the INU position estimate, if same then system determined VALID, otherwise, proceed to step d);
   d) comparing velocity of mobile machine as determined by the odometer and velocity as determined by the Doppler radar, if difference is greater than a first predetermined threshold, then the INU is INVALID, otherwise proceed to step e); and
   e) comparing heading rate from gyroscope with a calculated heading rate based on measured steering angle and velocity, if difference if greater than a second predetermined threshold, then the INU is INVALID, otherwise the GPS is INVALID.

2. A method, as set forth in claim 1, including the step of updating a position estimate determined by a Kalman filter located in said integrated positioning system, said Kalman filter position estimate being updated by at least one of said GPS and INU in response to the respective at least one GPS and INU being VALID.

3. A method, as set forth in claim 1, including the steps of:

comparing a current GPS INVALID determination to a previous GPS INVALID determination;

determining a condition of GPS fault existing in response to GPS INVALID determinations being greater than a third predetermined threshold;

stopping said mobile machine in response to said condition of GPS fault existing; and delivering a warning signal to a fleet manager.

4. A method, as set forth in claim 1, including the steps of:

comparing a current INU INVALID determination to a previous INU INVALID determination;

determining a condition of INU fault existing in response to INU INVALID determinations being greater than a fourth predetermined threshold;

stopping said mobile machine in response to said condition of INU fault existing; and delivering a warning signal to a fleet manager.

5. A method, as set forth in claim 1, including the steps of:

comparing an INU error bound to a predetermined allowable system accuracy; and stopping said mobile machine in response to both said error bound being greater than said system accuracy and the GPS being INVALID.

6. A method for monitoring the integrity of an integrated positioning system located on a mobile machine, the integrated positioning system including a GPS receiver and an inertial navigation unit (INU), the INU including an odometer, a Doppler radar, a gyroscope, and a sensor for measuring the steering angle of the mobile machine, including the steps of:

a) receiving a GPS position estimate from a GPS receiver;

b) receiving an INU position estimate from an inertial navigation unit;

c) comparing the GPS position estimate and the INU position estimate, if same then system determined VALID, otherwise, proceed to step d);

d) receiving a signal from the odometer and responsively determining a first velocity estimate of the mobile machine;

e) receiving a signal from the Doppler radar and responsively determining a second velocity estimate of the mobile machine;

f) comparing the first and second velocity estimates, determining that the INU is INVALID if the difference between the first and second velocity estimates is greater than a first predetermined threshold, otherwise proceed to step g);

g) receiving a first heading rate estimate from the gyroscope;

h) receiving a signal from the steering angle sensor and one of the first and second velocity estimates and responsively determining a second heading rate estimate;

i) comparing the first and second heading rate estimates, determining that the INU is INVALID if the difference between the first and second heading rate estimates is greater than a second predetermined threshold, otherwise, determining that GPS is INVALID.

7. A method, as set forth in claim 6, including the step of updating a position estimate determined by a Kalman filter located in said integrated positioning system, said Kalman filter position estimate being updated by at least one of said GPS and INU in response to the respective at least one GPS and INU being VALID.

8. A method, as set forth in claim 6, including the steps of:

comparing a current GPS INVALID determination to a previous GPS INVALID determination;

determining a condition of GPS fault existing in response to GPS INVALID determinations being greater than a third predetermined threshold;

stopping said mobile machine in response to said condition of GPS fault existing; and delivering a warning signal to a fleet manager.

9. A method, as set forth in claim 6, including the steps of:

comparing a current INU INVALID determination to a previous INU INVALID determination;

determining a condition of INU fault existing in response to INU INVALID determinations being greater than a fourth predetermined threshold;

stopping said mobile machine in response to said condition of INU fault existing; and delivering a warning signal to a fleet manager.

10. A method, as set forth in claim 6, including the steps of:

comparing an INU error bound to a predetermined allowable system accuracy; and stopping said mobile machine in response to both said error bound being greater than said system accuracy and the GPS being INVALID.

* * * * *